US005434192A

United States Patent [19]

Thach et al.

[11] Patent Number: 5,434,192

[45] **Date of Patent: * Jul. 18, 1995**

[54] HIGH-STABILITY FOAMS FOR LONG-TERM SUPPRESSION OF HYDROCARBON VAPORS

[75] Inventors: Sophany Thach, Dallas; Kenneth C. Miller, Richardson; Karen S. Schultz, Palestine, all of Tex.

[73] Assignee: Atlantic Richfield Company

[ * ] Notice: The portion of the term of this patent subsequent to Mar. 22, 2011 has been disclaimed.

[21] Appl. No.: 983,571

[22] PCT Filed: Sep. 19, 1991

[86] PCT No.: PCT/US91/06795

§ 371 Date: Feb. 2, 1993

§ 102(e) Date: Feb. 2, 1993

Related U.S. Application Data

[63] Continuation-in-part of Ser. No. 584,978, Sep. 19, 1990, abandoned.

[51] Int. Cl.[6] .......................... B01J 13/00; B01J 19/16

[52] U.S. Cl. .......................................... 521/50; 252/3; 252/8.05; 252/307; 252/382; 252/605; 252/610; 422/42; 521/65; 521/78; 530/210

[58] Field of Search ................... 530/210; 252/3, 8.05, 252/307, 382, 605, 610; 422/42; 521/50, 65, 78

[56] References Cited

U.S. PATENT DOCUMENTS

| | | | |
|---|---|---|---|
| 1,807,810 | 6/1931 | Rice . | |
| 1,907,982 | 5/1933 | King . | |
| 2,965,678 | 12/1960 | Sundberg et al. . | |
| 3,388,587 | 6/1968 | Hara et al. . | |
| 3,562,156 | 2/1971 | Francen et al. | 252/3 |
| 3,637,022 | 1/1972 | Kelly et al. . | |
| 3,639,258 | 2/1972 | Corino et al. . | |
| 3,772,195 | 11/1973 | Francen | 252/3 |
| 3,850,206 | 11/1974 | Canevari et al. . | |
| 3,956,138 | 5/1976 | Crockett | 252/3 |
| 4,042,522 | 8/1977 | Falk . | |
| 4,049,556 | 9/1977 | Tujimoto et al. . | |
| 4,090,967 | 5/1978 | Falk . | |
| 4,235,743 | 11/1980 | Canevari | 252/351 |
| 4,284,601 | 8/1981 | Chay et al. . | |
| 4,326,986 | 4/1982 | Canevari . | |
| 4,386,052 | 5/1983 | Canevari . | |
| 4,439,328 | 3/1984 | Moity . | |
| 4,442,018 | 4/1984 | Rand . | |
| 4,612,332 | 9/1986 | Bock et al. . | |
| 4,770,794 | 9/1988 | Cundasawmy et al. | 252/3 |
| 4,795,590 | 1/1989 | Kent et al. . | |
| 4,796,702 | 1/1989 | Scherubel . | |
| 4,836,939 | 6/1989 | Hendrickson . | |
| 4,859,349 | 8/1989 | Clark et al. | 252/3 |
| 4,963,668 | 10/1990 | Allen et al. . | |
| 4,999,119 | 3/1991 | Norman et al. . | |
| 5,296,164 | 3/1994 | Thach et al. | 252/307 |

OTHER PUBLICATIONS

Myers, Drew, *Surfactant Science and Technology,* 1988, pp. 1–15, 22–26, 40–42, 67–71, 90–95, 106–107, 129–132, 142–151, 167–169, 193–195 and 254–272.

Gross, et al., "Evaluation of Foams for Mitigating Air Pollution from Hazardous Spills".

*Primary Examiner*—Joseph L. Schofer
*Assistant Examiner*—John M. Cooney, Jr.
*Attorney, Agent, or Firm*—Michael E. Martin

[57] ABSTRACT

Novel formulations for aqueous foams which, in the presence of hydrocarbons, can persist for 24 hours or more. The foams are suitable for the suppression of hydrocarbon and polar organic vapors.

18 Claims, 8 Drawing Sheets

HIGH-STABILITY FOAMS FOR LONG-TERM SUPPRESSION OF HYDROCARBON VAPORS

CROSS-REFERENCE TO RELATED APPLICATIONS

This application is a continuation-in-part of patent application Ser. No. 07/584,978, filed Sep. 19, 1990, which is now abandoned, the entire disclosure of which is incorporated herein by reference.

BACKGROUND OF THE INVENTION

1. Field of the Invention

The present invention relates to dilute and concentrated foam formulations for the production of high-stability, high-expansion aqueous foams. Foams generated from the formulations may be used as a blanket to suppress the emission of volatile gases and vapors, such as hydrocarbon and polar organic vapors. More specifically, the present invention relates to aqueous foams for the suppression of hydrocarbon and polar organic vapors generated during loading of oil tankers, as well as during the transportation, transfer, storage, and accidental spillage of crude oil and lighter hydrocarbons. Foams according to the present invention can be prepared from fresh water, brackish water or sea water.

2. Description of the Prior Art

During loading of oil tankers, and during the transportation, transfer, storage, and accidental spilage of crude oil and lighter hydrocarbons, a large quantity of vapors may be released which poses a fire-hazard, as well as a threat to life or the environment. A hard-piped vapor-recovery system conventionally is used to remove the released hydrocarbon vapors for later incineration. This method however, is expensive and ultimately releases carbon dioxide, nitrogen oxides and sulfur oxides into the atmosphere as by-product of the hydrocarbon incineration.

Another possibility for handling such vapors is suggested by U.S. Pat. No. 3,639,258 to Corino which involves the use of a gelling material to create an integral roof by gelling the upper layer of the oil in a tank to provide a floating roof of the same material. This technique, while useful for some purposes, creates considerable difficulties in cleaning and maintaining tanks or tanker compartments.

Alternatively, as suggested in U.S. Pat. No. 3,850,206 to Canevari et al., a foamed vapor barrier can be used to suppress the release of volatile hydrocarbons. The vast majority of conventional aqueous foams and foams for fire-fighting/vapor suppression, however, do not persist for more than 30 minutes and only a few persist for up to 2 hours. Accordingly, conventional aqueous foams do not persist for a sufficient time to allow their use in connection with the suppression of the release of hydrocarbon vapors during a lengthy procedure such as the loading of a tanker which takes from 10 to 36 hours. Adding to the foam solution a water thickener such as a polysaccharide, polyacrylamide or sulfonated polystyrene, as prescribed in Canevari et al. '206, extends the foam stability to no more than a few hours, especially when the temperature exceeds 90° F.

In general, protein and fluoroprotein foams are capable of suppressing vapors of non-polar hydrocarbons below the lower explosive limit (LEL), usually about 2% or less of hydrocarbon gas in the air, for up to a few hours, but are not very effective against polar compounds.

Likewise, high-expansion foams of synthetic detergents and aqueous film-forming foams (AFFF), which form a spreading protective film over the hydrocarbon surface, are also capable of suppressing vapors of non-polar hydrocarbons for up to a few hours, but are equally ineffective against polar hydrocarbons.

Other AFFF foams that include an insoluble polymer complex formed from anionic polysaccharides and perfluoroalkyl surfactant cations are effective fire fighting foams but do not have sufficient stability to persist for more than a few hours.

Similarly, alcohol-type foams (ATF) consisting of a protein, surfactant, fluoroprotein or AFFF base and a metal stearate or polymer additive are capable of being effective for up to a few hours against polar hydrocarbons. In contrast, AFFF coupled with a polyurethane foam, e.g. the Light Water ® ATC product sold by the Minnesota Mining & Manufacturing Company, is very effective for longer suppression of polar and non-polar vapors. This product yields a semi-solid polyurethane foam with excellent mechanical strength. However, this type of foam leaves behind a non-collapsible polyurethane residue which is difficult to dispose of. Furthermore, all AFFF type foams contain a large amount of fluorocarbon surfactants which, although mostly inert, are not biodegradable and must be disposed of in a landfill.

In any case, however, for most formulations, high-quality or high-expansion foams having expansion ratios on the order of 100:1 to 1000:1 (100 to 1000 parts of gas for one part of foam solution) are the best types of foam for suppressing the release of volatile hydrocarbon vapors.

Three factors have been observed to control foam stability. In the first stage of foam life, water drainage controls foam stability. As water drains from the foam films (or lamellae), the films thin quickly to a small thickness. This stage usually lasts only a few minutes and is not very destructive to the bubbles. In the second stage of foam decay, the bubbles begin to slowly collapse, or coalesce into fewer but larger bubbles. Gas diffusion and, more importantly, water evaporation from the foam lameliae are the main causes of collapse at this stage. In the third and final stage, foam lamellae become so thin that small perturbations such as vibrations, shocks or sudden pressure or temperature changes, cause the remaining foam column to collapse catastrophically. All three stages of foam life usually last for less than a few hours. To further extend foam life, foam stability must be improved in all stages. Specifically, film drainage and water evaporation must be reduced, while mechanical strength must be improved.

In the presence of hydrocarbons, two additional factors further accelerate foam decay. First, hydrocarbon diffusion through the foam tends to destroy bubbles near the water-hydrocarbon interface. Second, surface active materials in the foam lamellae which are soluble in the hydrocarbons tend to partition into the hydrocarbons causing sudden collapse of the bubbles at the hydrocarbon interface.

The present invention overcomes the above-discussed disadvantages and drawbacks of the prior art. The present invention relates to new foam formulations with long stabilities in the presence of hydrocarbon and polar organic vapors. The formulations of the present invention include surface active materials and multifunctional additives which are selected to produce highly-stable foams, which will persist in the presence of hydrocarbon and polar organic vapors for several days at temperatures below 90° F., and up to 24 hours at 105° F. Unlike AFFF-polyurethane type foams, however, the formulations of the present invention leave behind primarily water-soluble residues, and a negligible amount of fluorocarbons.

SUMMARY OF THE INVENTION

The present invention provides foam compositions for suppressing hydrocarbon and polar organic vapors. Foams produced from the compositions of the present invention persist for a period of between twelve hours and several days at temperatures ranging from 75° to 105° F. The foam compositions of the present invention are capable of producing medium- to high-expansion foams containing at least 10 parts gas, such as nitrogen, carbon dioxide, flue gas and air, and 1 part foam composition.

Foam compositions according to the present invention comprise one or more nonionic surfactants, a fluorinated surfactant, a solvent, a polymer and water.

Those skilled in the art will further appreciate the above-described features of the present invention together with other superior aspects thereof upon reading the detailed description which follows.

DESCRIPTION OF PREFERRED EMBODIMENTS

Figure 1:
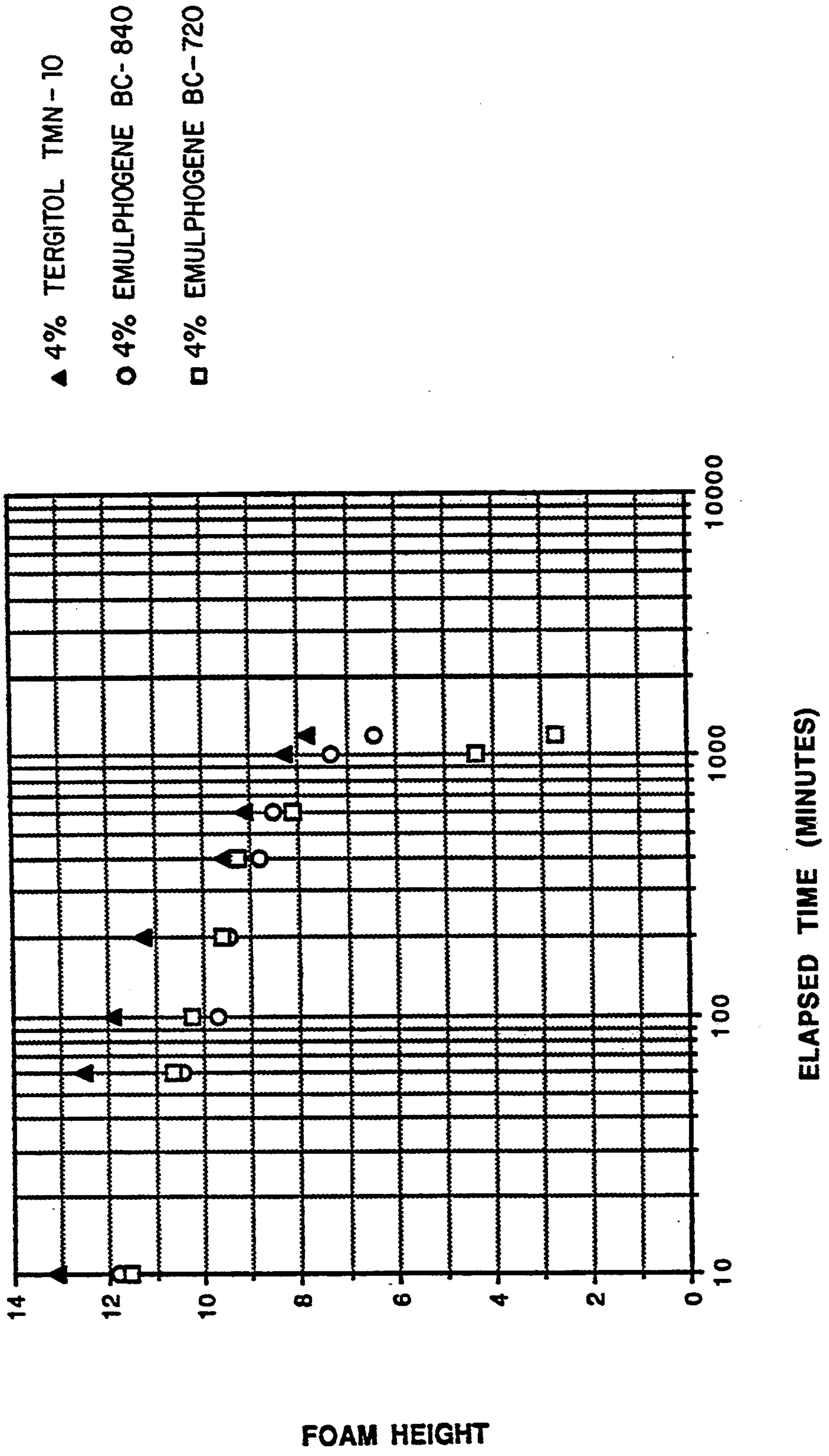
FIG. 1 is a graph showing the foaminess and foam stability of various foam formulations according to the present invention.

The present invention relates to aqueous foams for suppressing the release of hydrocarbon and polar organic vapors into the atmosphere, thus reducing environmental, health and safety risks. The foam formulations of the present invention yield foams that persist from 12 hours to several days at temperatures ranging from 75° to 105° F.

Foam compositions according to the present invention comprise one or more nonionic surfactants, a fluorinated surfactant, a solvent, a polymer and water.

According to a preferred embodiment, the fully diluted foam compositions comprise about 0.5 to 6.0% by weight of one or more nonionic surfactants, about 0.05 to 1.0% by weight of a fluorinated surfactant, about 1.0 to 10.0% by weight of a solvent, about 500 to 5,000 parts per million (ppm) of a polymer, and the balance being comprised of water.

In another preferred embodiment, the water added to the foam compositions, which shall be referred to hereinafter as "make-up water," is fresh water. As used herein, the term "fresh water" is defined to mean an aqueous solution that includes no more than 2.0% by weight of inorganic salts. In this embodiment, the fully diluted foam compositions of the present invention comprise about 2.0 to 4.0% by weight of one or more nonionic surfactants, about 0.2 to 0.4% by weight of a fluorinated surfactant, about 2.0 to 6.0% by weight of a solvent, about 1,000 to 2,500 ppm of a polymer, and the balance being comprised of fresh water make-up water. According to this embodiment the ratio of the one or more nonionic surfactants to the fluorinated surfactant ranges from 6:1 to 12:1 and preferably ranges from 8:1 to 10:1.

In still another preferred embodiment, the make-up water of the fully diluted foam compositions is relatively high in saline content, such as brackish water or sea water. As used herein, the term "sea water" is inclusive of brackish water and sea water and is defined to mean an aqueous solution that includes more than 2.0% by weight of inorganic salts. The foam compositions according to this embodiment are advantageous when a source of fresh water is not available and sea water must be used as the make-up water for the fully diluted foam compositions. In this embodiment, the fully diluted foam compositions comprise about 1.5 to 4.0% by weight of one or more nonionic surfactants, about 0.4 to 0.6% by weight of a fluorinated surfactant, about 4.0 to 8.0% by weight of a solvent, about 1,500 to 3,000 ppm of a polymer, and the balance being comprised of sea water make-up water. According to this embodiment the ratio of the one or more nonionic surfactants to the fluorinated surfactant ranges from 1.5:1 to 9.5:1 and preferably ranges from 2.4:1 to 5.0:1.

Those of ordinary skill in the art will recognize that based on the relative proportions of the components of the fully diluted foam compositions, the fluorinated surfactant functions as a co-surfactant with respect to the nonionic surfactant and the solvent functions as a co-solvent with respect to the water.

Concentrated foam compositions according to the present invention comprise one or more nonionic surfactants, a fluorinated surfactant, a polymer, a solvent and sufficient make-up water to solubilize the polymer. The one or more nonionic surfactants, the fluorinated surfactant, the solvent and the polymer are present in the concentrated foam compositions in the same relative proportion but in higher absolute percentages since less water is present. Fully diluted foam compositions according to the present invention are prepared by diluting the concentrated foam compositions with a total of up to 98.1% by weight of make-up water.

It is known in the art of fire fighting gels and foams that an insoluble polymer complex may be formed from an anionic polysaccharide and a cationic perfluoroalkyl surfactant, for instance see U.S. Pat. No. 4,859,349. It has been discovered according to the present invention, however, that a high-stability foam that persists for at least 12 hours at 105° F. may be produced from compositions which include an ionic polymer, an ionic fluorinated surfactant having a charge opposite that of the ionic polymer, one or more nonionic surfactants, a solvent, and water. It is well known in the art that such a mixture of surfactants and solvent forms mixed micelles in aqueous solution. Preferably, the compositions include sufficient quantities of the one or more nonionic surfactants, the solvent and water to maximize the electrical attraction between the mixed micelles and the polymer without causing the precipitation of a surfactant/polymer complex. It has also been discovered that the surfactant/polymer attraction increases the foam stability while precipitation of a surfactant/polymer complex severely diminishes the stability of foams produced from compositions that include the complex.

Accordingly, in further preferred embodiments of the present invention, the fluorinated surfactant and the polymer of the foam compositions are ionic and have opposite charges. Most preferably, the fluorinated surfactant is cationic and the polymer is anionic.

Suitable nonionic surfactants for the foam compositions of the present invention preferably are highly-water soluble, are insoluble in nonpolar hydrocarbons, are very slightly soluble in polar hydrocarbons, have a very low air/water surface tension and produce a large amount of foam. Accordingly, suitable nonionic surfactants have a hydrophilic head and a hydrophobic (lipophilic) tail, with a hydrophilic to lipophilic balance (HLB) of greater than 12 to provide good water solubility.

Preferably, the hydrophobic tail includes less than 16 carbon atoms and most preferably 9 to 12 carbon atoms to minimize solubility in oil. Also, the tail preferably is a branched alkyl chain which leads to a reduced surface tension. Reduced surface tension reduces the energy needed to make foam which in turn leads to a greater foam height.

As noted above, preferred fully diluted foam compositions according to the present invention comprise about 0.5 to 6.0% by weight of one or more nonionic surfactants. Foams produced from the fully diluted foam compositions will tend to be less stable if less than 0.5% by weight of the nonionic surfactants are included in the formulation. The performance of the foam formulations will not be enhanced and may be compromised when the foam compositions include more than 6.0% by weight of the nonionic surfactants.

When the make-up water of the foam compositions is fresh water, the nonionic surfactants preferably comprise about 2.0 to 4.0% by weight of the compositions and may be selected from the family of alkyl polyoxyethylenes. A preferred class of alkyl polyoxyethylenes is alkylpolyethylene-glycol ethers wherein the alkyl chain thereof includes 8 to 16 carbon atoms, preferably 12 to 13 carbon atoms, and wherein the water-soluble portion includes about 4 to 40, preferably about 10 to 20, ethylene oxide repeating units. Suitable alkylpolyethylene-glycol ethers are trimethyl nonylpolyethylene-glycol ether which is commercially available as Tergitol TMN-10 or TMN-6 from Union Carbide Corporation and Emulphogene BC-720 ($C_{13}EO_{9.75}$) or BC-840 ($C_{13}EO_{15}$) from Rhone-Poulenc.

Foams generated from fully diluted foam compositions in which the make-up water of the foam compositions is sea water and the nonionic surfactants are selected from the family of alkylpolyethylene-glycol ethers are often unstable and collapse after the passage of a few hours.

Accordingly, when the make-up water of the foam compositions is sea water, the nonionic surfactants preferably comprise about 1.5 to 4.0% by weight of the compositions and may be selected from the family of alkyl polyglycosides wherein the alkyl chain thereof includes 8 to 14 carbon atoms and wherein the hydrophilic portion includes about 1.0 to 2.0 repeating glucose units. These surfactants or mixtures thereof have a hydrophilic-lipophilic balance (HLB) number of greater than 12 and thus have good water solubility and low susceptibility to the salinity of the make-up water. The hydrophobic portion of the nonionic surfactants preferably includes less than 16 carbon atoms, most preferably, 9–12 carbon atoms, thus providing very low oil solubility. Preferably, the hydrophobic portion of the nonionic surfactants is a branched alkyl chain which reduces the surface tension of the foam compositions. These surfactants, are therefore capable of producing a large amount of foam, These surfactants do not have a cloud point, thus extending their use to high salinity and high temperature conditions without a loss of solubility or substantial partitioning into the oil phase.

Suitable alkyl polyglycosides are those having the formula:

$$C_nH_{2n+1}O(C_6H_{10}O_5)_xH$$

wherein n=8–14 and x=1–2.

Commercially available alkyl polyglycosides are APG-225, APG-300, APG-325, APG-600 and APG-625 from Henkel Corporation. The formulae and properties of APG-225, APG-300, APG-325, APG-600 and APG-625 are indicated in Table 1. The foam compositions of the present invention may include one or more alkyl polyglycosides.

TABLE 1

| | Formula | Activity | HLB[1] |
|---|---|---|---|
| APG-225 | $C_{8-10}H_{17-21}O(C_6H_{10}O_5)_{1.8}H$ | 70.9 wt. % | 13.6 |
| APG-300 | $C_{9-11}H_{19-23}O(C_6H_{10}O_5)_{1.4}H$ | 50.9 wt. % | 12.6 |
| APG-325 | $C_{9-11}H_{19-23}O(C_6H_{10}O_5)_{1.6}H$ | 68.0 wt. % | 13.1 |
| APG-600 | $C_{12-16}H_{25-33}O(C_6H_{10}O_5)_{1.4}H$ | 49.3 wt. % | 11.5 |
| APG-625 | $C_{12-16}H_{25-33}O(C_6H_{10}O_5)_{1.6}H$ | 50.3 wt. % | 12.1 |

[1]HLB refers to the hydrophilic-lipophilic balance number

The fluorinated surfactant, preferably, is very slightly soluble in oil, is highly soluble in water and is highly surface-active to induce low air/water surface tension and film spreading over the hydrocarbon to protect the produced foams from hydrocarbon gas and crude oil. The fluorinated surfactant has a hydrophilic head and a hydrophobic tail. The hydrophobic tail, preferably, is short, such as an 8–16 carbon atom chain, most preferably a 9–12 carbon atom chain, to minimize oil solubility. The fluorinated, surfactants produce lower surface tensions with nonionic ,surfactants than similar hydrocarbon surfactants. These surfactants also have little or no tendency to partition into the liquid hydrocarbon. The fluorinated surfactant increases foam fluidity and preferably includes a long chain fluoroalkyl group. The fluorinated surfactant may be selected from the group of fluorinated quaternary ammonium halides, especially iodides and chlorides, or may be a fluorinated zwitterionic surfactant. A suitable fluorinated quaternary ammonium chloride is commercially available as Fluorad FC-754 from Minnesota Mining & Manufacturing Company (3M). A suitable fluorinated quaternary ammonium iodide is commercially available as Fluorad FC-350 from 3M.

As noted above, the foam compositions preferably include an ionic fluorinated surfactant and an oppositely-charged ionic polymer to enable the formation of mixed micelles that are electrically attracted to the ionic polymer. Most preferably, the fluorinated surfactant is cationic such as the fluorinated quaternary ammonium halide surfactants discussed above.

As noted above, when the fully diluted foam compositions include fresh water make-up water, the compositions preferably comprise about 0.2 to 0.4% by weight of the fluorinated surfactant. When the fully diluted foam compositions include sea water make-up water, the compositions preferably comprise about 0.4 to 0.6% by weight of the fluorinated surfactant.

Also, when the fully diluted foam compositions include fresh water make-up water, the ratio of the one or more nonionic surfactants to the fluorinated surfactant preferably ranges from about 6:1 to about 12:1 and most preferably ranges from about 8:1 to about 10:1.

When the fully diluted foam compositions include sea water make-up water, the ratio of the one or more nonionic surfactants to the fluorinated surfactant preferably ranges from about 1.5:1 to about 9.5:1 and most preferably ranges from about 2.4:1 to about 5.0:1.

The above-mentioned ratios of the one or more nonionic surfactants to the fluorinated surfactant is sufficient to prevent the precipitation of a surfactant/polymer complex. For the fresh water and sea water compositions if the ratio of nonionic surfactant to fluorinated cationic surfactant is less than the minimum ratios indicated above, a surfactant/polymer complex will precipitate out of solution. Also, for both compositions, if the ratio of nonionic surfactant to fluorinated cationic surfactant is higher than the maximum ratios indicated above, the electrical attraction between the mixed micelles and polymer is not sufficient to promote high foam stability, such as persistance for at least 12 hours at 105° F.

The solvent preferably is highly soluble in water, has a very high affinity for water, increases the thickness and mechanical strength of the film, promotes the formation of structured liquid phases in the film, improves film elasticity and improves foam fluidity. The solvent also enhances the compatibility of the components of the concentrated foam compositions and contributes to the prevention of the gelling of the compositions. By virtue of increasing the film thickness and mechanical strength, the solvent reduces the rates of gas diffusion through and water evaporation from the foams. The solvent, preferably, is selected from the family of alcohols such as methanol, ethanol, isopropanol, glycerol, ethylene glycol, polyethylene glycol, and combinations thereof. The polyethylene glycol, preferably, has a molecular weight of about 600 to 4000.

As noted above, when the fully diluted foam compositions include fresh water make-up water, the compositions preferably comprise about 2.0 to 6.0% by weight of the solvent. When the fully diluted foam compositions include sea water make-up water, the compositions preferably comprise about 4.0 to 8.0% by weight of the solvent.

The polymer, preferably, is a high-viscosity polysaccharide, biopolymer or synthetic polymer that is highly interactive with the fluorinated surfactant of the compositions. The polymer preferably has a molecular weight between 1 and 5 million. Also, the polymer preferably has good water solubility and very low oil solubility. The polymer increases the foam stability by retarding water drainage, reducing water evaporation, and increasing the film thickness. The polymer greatly improves the mechanical strength of the film.

As noted above, the foam compositions preferably include an ionic polymer and an oppositely-charged ionic fluorinated surfactant to enable the formation of mixed micelles that are electrically attracted to the ionic polymer. Most preferably, the polymer is anionic.

The polymer may be a water dispersible or soluble hydrophilic colloid selected from the group consisting of cellulose derivatives, gum ghatti, gum arabic, gum tragacanth, locust bean gum, gum karaya, guar gum, carrageenan, algin, biopolymers, and mixtures thereof. These polymers may be used unmodified, as normally isolated from their source materials, or they may be modified as is well known in the polymer art such as by hydroxyalkylation, carboxyalkylation, or mixed hydroxyalkylation carboxyalkylation. Specific examples of modified polymers are carboxymethyl-2-hydroxypropylpropyl-ether guar gum and 2-hydroxy-3-(trimethyl ammonio)propyl-ether chloride guar gum. Many of these derivatives form clear solutions in water. Thus the term water-soluble polymer is intended to mean polymers which form colloidal solutions or colloidal dispersions in water.

The sources of these gums are well known. Gum ghatti is derived from an exudate of the *Anogeissus latifolia* tree of the Combretaccae family. Gum arabic is derived from an exudate of the acacia tree. Gum tragacanth is derived from an exudate of various species of shrubs belonging to the genus Astragalus. Gum karaya is derived from an exudate of the *Sterculia ureus* tree. Locust bean gum is derived from the fruit of the carbo tree (*Ceratonia siligua*). Guar gum is derived from the seeds of two annual leguminous plants, *Cyamopsis tetragonalobus* and *Cyamopsis psoraloides*. Algin is derived from all brown seaweeds, of the family Phaeophyceae, although principally from the giant kelp *Macrosystis pyrifera*. Carrageenan is derived from certain species of red seaweeds of the Gigartinaceae, Solieriaceae, Phylophoraceae, and Hypneaceae families.

The biopolymers may be selected from xanthan gum and welan gum. Commercially available xanthan gum biopolymers can be obtained from Kelco Div., Merck & Co., Inc. under the trademark of "Kelzan" or from Pfizer, Inc. under the trademark of "Flocon." Welan gum is a polymer made by an Alcaligenes bacteria identified as S-130. The chemical structure of welan gum is disclosed in U.S. Pat. No. 4,342,866, the disclosure of which is incorporated herein by reference. Welan gum is commercially available under the trade name BIOZAN® from Kelco Div., Merck & Co., Inc.

Accordingly, the polymer may comprise natural and modified natural gums such as gum ghatti, gum arabic, gum tragacanth, locust bean gum, gum karaya, guar gum, carrageenan, algin, biopolymers such as xanthan gum or Welan gum and the hydroxyethyl, carboxymethyl, hydroxyethyl carboxymethyl and hydroxypropyl ether derivatives thereof as well as hydroxyethyl, carboxymethyl, hydroxyethyl carboxymethyl and hydroxypropyl ether derivatives of cellulose and mixtures thereof.

The synthetic polymers may be selected from polyimines, poly(acrylic acid), poly(methacrylic acid), poly(-maleic acid-co-ethylene), poly(maleic acid-co-ethylvinylether), poly(maleic acid-co-butylvinylether), poly(-maleic acid-co-styrene), poly(maleic acid-co-indene), poly(vinylsulfuric acid), poly(styrenesulfonic acid), polyphosphate (linear), dextransulfate, poly(L-glutamic acid), and bovine serum albumin.

Preferred polymers for use in the foam formulations of the present invention are xanthan gum, and modified guar gums such as carboxymethyl-2-hydroxypropyl-propyl-ether guar gum and 2-hydroxy-3-(trimethyl ammonium) propyl ether chloride guar gum. A particularly preferred polymer is xanthan gum having a molecular weight of about 1 million to 10 million, preferably about 4 million, which is commercially available from Kelco Div., Merck & Co., Inc. in different grades, for example as Kelzan®, Xanvis® and Keltrol®, as a highly active powder with varying amounts and types of impurities, such as cell debris, or as a 4.0% by weight broth, or from Pfizer, Inc. as a 4.0 to 11.7% by weight broth, for example Flocon 4800C ®. If xanthan gum having a molecular weight of less than 1 million is used in the foam compositions, the foams will tend to be less stable.

As noted above, when the fully diluted foam compositions comprise fresh water make-up water, the compositions preferably comprise about 1000 to 2500 ppm of the polymer. When the dilute foam compositions comprise sea water make-up water, the compositions preferably comprise about 1500 to 3000 ppm of the polymer.

The final foam is generated from the fully diluted foam compositions of the present invention at an expansion ratio of from about 10 to 1000 or more parts of gas such as nitrogen, carbon dioxide, flue gas and air to 1 part dilute foam solution. Commercially available and conventional proportioning units and foam generators such as aspirator-type generators for medium expansion ratios up to about 200 such as the Mini-X-II by Mining Safety Appliances Company, and fan-type generators for high expansion ratios above 200 such as the super Jet-X-II by Rockwood Systems Corp., may be used to produce the final foam. Those skilled in the art will recognize that the foams of the present invention may be produced by any conventional proportioning units and foam generators.

A preferred composition comprising fresh water make-up water and generating a foam with the highest stability having a persistence of about 3–5 days below 90° F. and about 24 hours at 105° F., comprises 4.0% by weight of trimethylnonyl-polyethylene glycol ether (Tergitol TMN-10), 0.4% by weight of a cationic fluorinated quaternary ammonium chloride (Fluorad FC-754 by 3M), 6.0% by weight of glycerol, 1600 ppm of anionic xanthan gum (Flocon 4800C by Pfizer); and up to 89.44% by weight of fresh water make-up water.

An alternate preferred composition comprising fresh water make-up water and generating a foam with the highest stability having a persistence of 3–5 days below 90° F. and about 24 hours at 105° F., comprises 2.0% by weight of trimethylnonyl-polyethyleneglycol ether (Tergitol TMN-10), 0.225% by weight of a cationic fluorinated quaternary ammonium chloride (Fluorad FC-754), 5.0% by weight of glycerol, 1800 ppm of anionic xanthan gum (Flocon 4800C); and up to 92.6% by weight of fresh water make-up water.

A preferred composition comprising sea water make-up water and generating a foam with the highest stability having a half-life of about 24 hours at 105° F. in the presence of Alaskan crude oil, comprises 1.47% by weight of alkyl polyglycoside (APG 300 Glycoside by Henkel), 0.5% by weight of a cationic fluorinated quaternary ammonium chloride (Fluorad FC-754 by 3M), 6.0% by weight of glycerol, 2800 ppm of anionic Xanthan gum (Flocon 4800C by Pfizer); and up to 90.72% by weight of sea water make-up water.

An alternate preferred composition comprising sea water make-up water and generating a foam with the highest stability having a half-life of about 24 hours at 105° F. in the presence of Alaskan crude oil, comprises 1.375% by weight of APG 225 alkyl polyglycoside, 0.638% by weight of APG 300 alkyl polyglycoside, 0.5% by weight of a cationic fluorinated quaternary ammonium chloride (Fluorad FC-754), 8.0% by weight of glycerol, 2800 ppm of anionic xanthan gum (Flocon 4800C), and up to 89.21% by weight of sea water make-up water.

Those of ordinary skill in the art will recognize that aqueous foams are thermodynamically unstable and the role of each component of the fully diluted foam compositions of the present invention is to retard foam decay. Also, it will be recognized that foams generated from the fully diluted foam compositions of the present invention will eventually collapse to leave primarily liquid wastes.

As with most fire-fighting foams, the concentrated foam compositions of the present invention may be used for ease of storage. The concentrated foam compositions of the present invention may be diluted subsequently with make-up water at the time of the application. Long-term storage (over several weeks) of the foam concentrate may require inclusion of a biocide to prevent biodegradation although the nonionic surfactant and the fluorinated surfactant in the concentrate should suppress biodegradation for a few weeks. Accordingly, the foam compositions of the present invention may also include a suitable biocide such as formaldehyde, glutaraldehyde or a cationic surfactant. The composition, preferably, includes 500 ppm formaldehyde or 125 ppm glutaraldehyde.

The compositions of the present invention, preferably, are used as medium to high-expansion foams, which offer many advantages. First, they require a relatively small amount of water and surfactants, thus minimizing hydrocarbon contamination and the impact on a refinery after foam collapse. Second, high-expansion foams, may be generated at a very high rate (from 500 to 30,000 $ft^3$ of foam per minute), thus minimizing the duration of foam application. Using a fan-blower for high-expansion foams, i.e., foams having an expansion ratio of more than 300, a one-foot thick foam blanket for a one-million-barrel tanker (about 15,000 barrels or 90,000 $ft^3$ of foam) may be generated in 10 minutes to two hours.

As the foams of the present invention collapse, the water-soluble components of the foam compositions drain toward the bottom of a tanker. Specifically, all of the fluorinated surfactant (at most 1.0% by weight of the foam solution), most of the nonionic surfactant (over 80% of the original amount used), and all of the solvent and polymer drain toward the bottom of the tanker. With mixing, however, this aqueous solution may be dispersed in the oil. Accordingly, essentially all of the components of the foam compositions will be removed from the hydrocarbon in conventional settling tanks and desalting units at an oil refinery. The risk of additional foaming or emulsification in these units is small, unless the crude oil already contains a substantial amount of natural surfactants. Additional foam and emulsions may be suppressed by conventional defoamers or demulsifiers.

Given the small amount of foam composition in the tanker (less than 500 ppm of the oil), the surfactant concentration in the oil delivered to the refinery should also be correspondingly small, i.e. less than 20 ppm. The nonionic surfactant in the foam solution is highly water soluble and only slightly oil soluble. Thus, only about 20% of the original amount of the nonionic surfactant is expected to partition into the oil, lessening the chance that water-in-oil emulsions or other undesirable materials will be created that will tend to upset further oil processing stages. After oil washing with water at a rate of approximately 4–6% by volume of water based on oil, the surfactant concentration in the wash water remains low leading to less chance of emulsifying or foaming.

The foam compositions of the present invention offer many advantages over existing foams. Specifically, the foams of the present invention persist for 12 hours to several days, as opposed to most existing fire-fighting foams which last for 30 minutes to two hours.

The foams of the present invention also provide effective vapor suppression for 12 hours to several days, as opposed to AFFF-type foams which may provide vapor suppression for about two hours. Compared to the AFFF-polyurethane combination, the formulations of the present invention provide effective vapor suppression. The foams of the present invention suppress 80 to 95% of the hydrocarbons evaporated from crude oils at temperatures of 90° to 105° F.

Moreover, unlike the AFFF-polyurethane combination, which leaves a residue of solid polyurethane foam and a large amount of non-biodegradable fluoroalkyl surfactants, foams produced according to the composition of the present invention collapse leaving a residue of primarily water-soluble and biodegradable materials.

Furthermore, with the long-lasting foams of the present invention, one application is sufficient to reduce the rate of vapor release for example for the entire loading of a tanker, whereas many applications are necessary with shorter-lived foams for the same protection. Indeed, short-lived foams requiring repeated application may not be feasible for suppressing hydrocarbon vapor release during the loading of a tanker because of time demand, cost and the consequent large amount of drained liquid.

The persistence of the foams of the present invention may be adjusted with the same concentrate by varying the dilution with water, or by changing the amount and identity of the solvent. Finally, certain foam compositions of the present invention may be prepared with fresh water make-up water while other foam compositions of the present invention may be prepared with sea water make-upwater. This is an important consideration for remote oil-loading locations where a large source of fresh water may not be available.

The present invention will be described in more detail with reference to the following examples. These examples are merely illustrative of the present invention and are not intended to be limiting.

EXAMPLE 1

FOAM STABILITY

The components of a foam composition according to the present invention which included fresh water make-up water were mixed in a 25-ml graduated cylinder to make up 10 grams of aqueous solution. The solution was heated to 105° F. and then hand-shaken vigorously to produce a foam column which usually filled the graduated cylinder. 5 ml of crude oil was added to the bottom of the container, and the container was then placed inside a 105° F. oven. A video camera system monitored the foam decay for 24 hours. For a given foam composition, this procedure does not accurately reproduce the actual foam height that would be generated within a tanker. However, this procedure does provide an accurate model of foam decay so that an assessment of relative foam stability can be made.

The highly stable foams of the present invention decay in three stages. The foams remain virtually unchanged for about 30 minutes (time $T_i$), then decay at a very slow rate (usually about 0.5 cm or 0.2 inch per hour) for about 10 hours ($T_s$) after which time they begin to collapse more quickly and finally disappear ($T_d$). This behavior suggests that phenomena other than liquid drainage control long-term foam stability. Liquid drainage in conventional foams causes very rapid foam decay in the first few minutes or even seconds, followed by a slower rate of decay, which is likely caused by water evaporation and biodegradation of polymer within the foam.

Table 2 below summarizes the results of stability tests conducted on various foams according to the present invention. All compositions tested and represented in Table 2 include 4.0% by weight Tergitol TMN-10, 0.4% by weight Fluorad FC-754, 1600 ppm Xanthan gum (with 500 ppm formaldehyde) and water. In Table 2 "GLY" refers to glycerol, "EG" refers to ethylene glycol, "PEG" refers to polyethylene glycol and "$T_{\frac{1}{2}}$" *refers to the time it takes the foam column to collapse to half of its original height.*

TABLE 2

OPTIMIZING FOAM FORMULATION WITH GLYCEROL, ETHYLENE GLYCOL & POLYETHYLENE GLYCOLS

| GLY % | EG % | PEG-600, % | PEG-4000, % | $T_i$ Hours | $T_s$ Hours | $T_{\frac{1}{2}}$ Hours | $T_d$ Hours | Observations |
|---|---|---|---|---|---|---|---|---|
| — | — | — | 4 | 0.4 | 5 | 5.5 | 16 | Thin foam |
| — | — | — | 2 | 0.5 | 4 | 7.5 | 17.5 | Thin foam |
| 4 | 4 | — | — | 0.1 | 3 | 3.5 | 7 | — |
| 4 | 2 | 4 | — | 0.1 | 3 | 3.5 | 7 | — |
| — | 4 | 4 | — | 0.1 | 3 | 3.5 | 7 | — |
| 4 | — | — | — | 0.8 | 15 | 17 | 35 | Stable foam |
| 6 | — | — | — | 0.8 | 15 | 17 | 35 | Stable foam |
| — | 4 | — | — | 0.7 | 10 | 12 | 23 | Stable foam |
| — | 6 | — | — | 0.7 | 10 | 12 | 23 | Stable foam |
| — | — | 4 | — | 0.7 | 10 | 12.5 | 30 | Thin foam |
| — | — | 6 | — | 0.7 | 10 | 18 | 30+ | Thin foam |
| — | — | — | 4 | 0.7 | 10 | 10.5 | 18 | Thin foam |
| — | — | — | 6 | 0.7 | 10 | 11 | 24 | Thin foam |

FIG. 1 is a graph of foaminess in terms of foam height and foam stability in terms of elapsed time for foams including 4.0% by weight of Tergitol TMN-10, Emulphogene BC-720 or Emulphogene BC-840 and 0.4% by weight of Fluorad FC-754, 6.0% by weight of glycerol, 1600 ppm xanthan gum (with 500 ppm formaldehyde) and a balance of fresh water. As shown in FIG. 1, foams made with each surfactant persisted for more than 15 hours although foams made with Tergitol TMN-10 and Emulphogene BC-840 had slightly greater stability than foams made from Emulphogene BC-270. Also as shown in FIG. 1, foams made with Tergitol TMN-10 have greater foaminess than foams made with Emulphogene BC-840 and Emulphogene BC-270, while foams made with Emulphogene BC-840 have essentially the same foaminess as foams made with Emulphogene BC-270.

Foaminess and foam stability tests were conducted for foams including 4.0% by weight of either Emulphogene BC-720 or Emulphogene BC-840, 0.4% by weight of Fluorad FC-754, 2.0% by weight of glycerol, 4.0% by weight of ethylene glycol, 1600 ppm xanthan gum (with 500 ppm formaldehyde) and a balance of fresh water. Foams made with each surfactant persisted for more than 15 hours although foams made with Emulphogene BC-720 had greater stability and foaminess than foams made with Emulphogene BC-840.

Foaminess and foam stability tests were conducted for foams including 4.0% by weight of Tergitol TMN-10, 0.4% by weight of Fluorad FC-754, 4.0% or 6.0% by weight of glycerol, 1600 ppm xanthan gum (with 500 ppm formaldehyde) and a balance of fresh water. Foams made with either percentage of solvent persisted for more than 15 hours and had approximately the same stability. However, foams made with 6.0% by weight of glycerol had slightly greater foaminess than foams made with 4.0% by weight of glycerol.

Foaminess and foam stability tests were conducted for foams including 4.0% by weight of Tergitol TMN-10, 0.4% by weight of Fluorad FC-754, 4.0% or 6.0% by weight of ethylene glycol, 1600 ppm xanthan gum (with 500 ppm formaldehyde) and a balance of fresh water. Foams made with either percentage of solvent persisted for more than 15 hours and had approximately the same stability and foaminess.

Foaminess and foam stability tests were conducted for foams including 4.0% by weight of Tergitol TMN-10, 0.4% by weight of Fluorad FC-754, 4.0% or 6.0% by weight of polyethylene glycol having a molecular weight of 600, 1600 ppm xanthan gum (with 500 ppm formaldehyde) and a balance of fresh water. Foams made with either percentage of solvent persisted for more than 15 hours, although foams made with 6.0% by weight of polyethylene glycol having a molecular weight of 600 had greater stability and foaminess than foams made with 4.0% by weight of polyethylene glycol having a molecular weight of 600.

Foaminess and foam stability tests were conducted for foams including 4.0% by weight of Tergitol TMN-10, 0.4% by weight of Fluorad FC-754, 4.0% or 6.0% by weight of polyethylene glycol having a molecular weight of 4000, 1600 ppm xanthan gum (with 500 ppm formaldehyde) and a balance of fresh water. Foams made with either percentage of solvent persisted for more than 15 hours and had approximately the same stability and foaminess.

Foaminess and foam stability tests were conducted for foams including 4.0% by weight of Emulphogene BC-720 or Emulphogene BC-840, 0.4% by weight of Fluorad FC-754, 6.0% by weight of ethylene glycol, 1600 ppm xanthan gum (with 500 ppm formaldehyde) and a balance of fresh water. Foams made with either nonionic surfactant persisted for more than 15 hours and had similar stabilities while foams made with 4.0% by weight of Emulphogene BC-840 had greater foaminess than foams made with 4.0% by weight of Emulphogene BC-270.

Foaminess and foam stability tests-were conducted for foams including 2.0% by weight of Tergitol TMN-10, 0.2% by weight of Fluorad FC-754, 4.0% by weight of glycerol, 1600 or 1200 ppm xanthan gum and a balance of fresh water. Foams made with either amount of xanthan gum persisted for more than 15 hours and had approximately the same stability and foaminess.

Foaminess and foam stability tests were conducted for foams including 3.0% by weight of Tergitol TMN-10, 0.3% by weight of Fluorad FC-754, 4.0% by weight of glycerol, 1600 or 1200 ppm xanthan gum and a balance of fresh water. Foams made with either amount of xanthan gum persisted for more than 15 hours and had approximately the same stability and foaminess.

Foaminess and foam stability tests were conducted for foams including 2.0% by weight of Tergitol TMN-10, 0.2% by weight of Fluorad FC-754 and 2.0% by weight of glycerol and 1600 ppm xanthan gum; 3.0% by weight of glycerol and 1600 ppm xanthan gum, or 3.0% by weight of glycerol and 1200 ppm xanthan gum; and a balance of fresh water. These foams persisted for more than 15 hours and had approximately,the same stability and foaminess.

Figure 2:
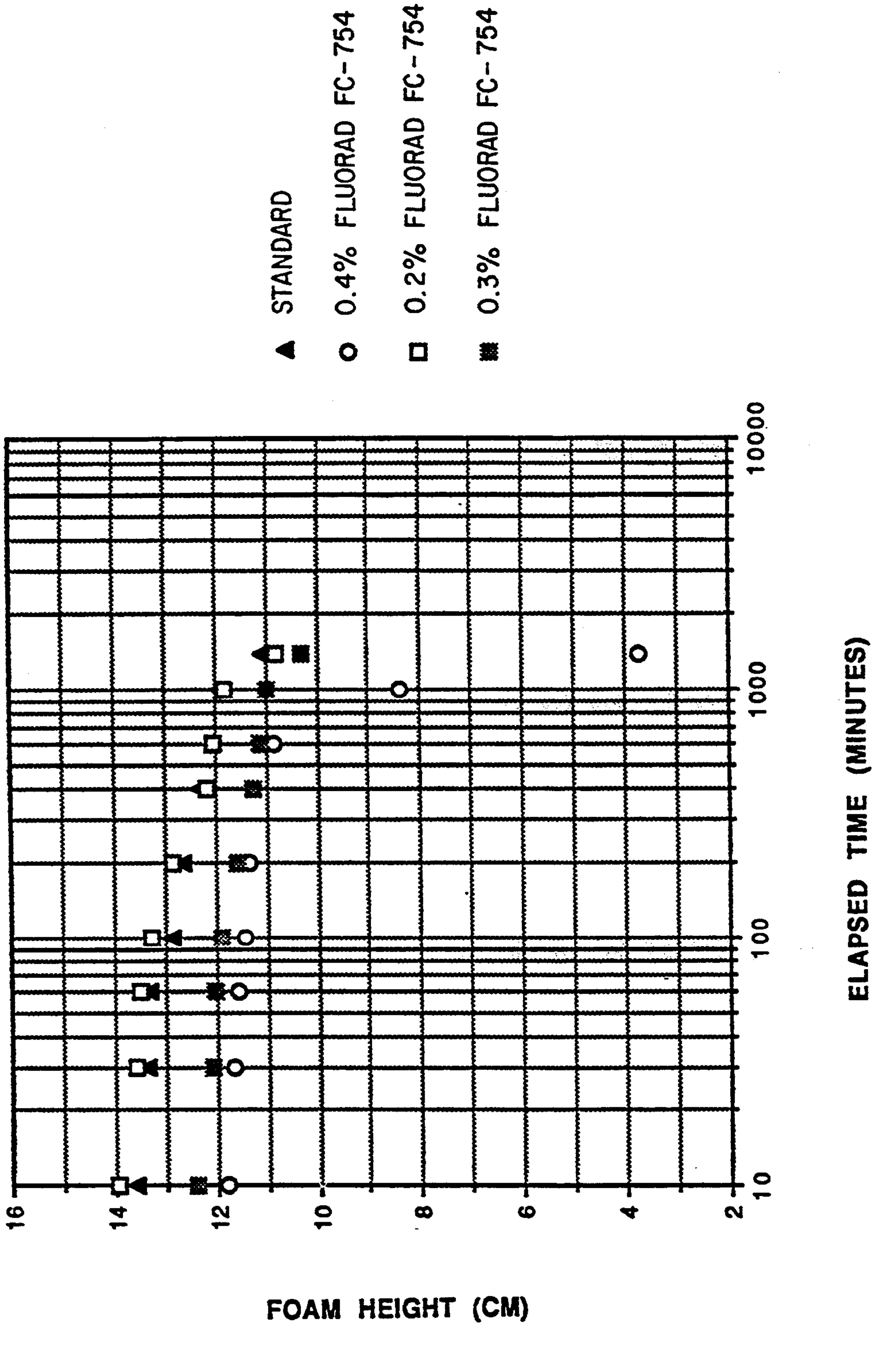
FIG. 2 is a graph showing the foaminess and foam stability of various foam formulations according to the present invention.

FIG. 2 is a graph of foaminess in terms of foam height and foam stability in terms of elapsed time for a standard foam composition including 4.0% by weight Tergitol TMN-10, 0.4% by weight Fluorad FC-754, 6.0% by weight glycerol, 1600 ppm xanthan gum, 500 ppm formaldehyde, and water; and for foam compositions including 2.0% by weight of Tergitol TMN-10 with 0.2, 0.3 or 0.4% by weight of Fluorad FC-754. As shown in FIG. 2, these foams persisted for more than 15 hours and foams made with 0.2% and 0.3% by weight of Fluorad FC-754 and the standard foam had approximately equal stability, while foams made with 0.4% by weight of Fluorad FC-754 had reduced stability. Also foams made with 0.2% by weight of Fluorad FC-754 and the standard foam had increased foaminess compared to foams made with either 0.3% or 0.4% by weight of Fluorad FC-754. These foams demonstrate the impact of the nonionic surfactant to fluorinated surfactant ratio on the stability of the foam. For instance, the foam including 2.0% by weight of the nonionic surfactant (Tergitol) and 0.4% by weight of the fluorinated surfactant (Fluorad) had a nonionic surfactant to fluorinated surfactant ratio of 5:1 which is outside the preferred ratio range for fresh water compositions. This foam had the poorest stability of the foams depicted in FIG. 2. The other foams had nonionic surfactant to fluorinated surfactant ratios of 10:1 and about 6.7:1 which are within the preferred ratio range.

Foaminess and foam stability tests were conducted for foams including 2.0% by weight of Tergitol TMN-10, 0.4% by weight of Fluorad FC-754, 6.0% by weight of glycerol and 1600 or 1000 ppm xanthan gum. These foams barely lasted for about 15 hours and had approximately equal stability while foams including 1600 ppm xanthan gum had greater foaminess than foams including 1000 ppm xanthan gum.

EXAMPLE 2

Reduction Vapour Emission

Figure 3:
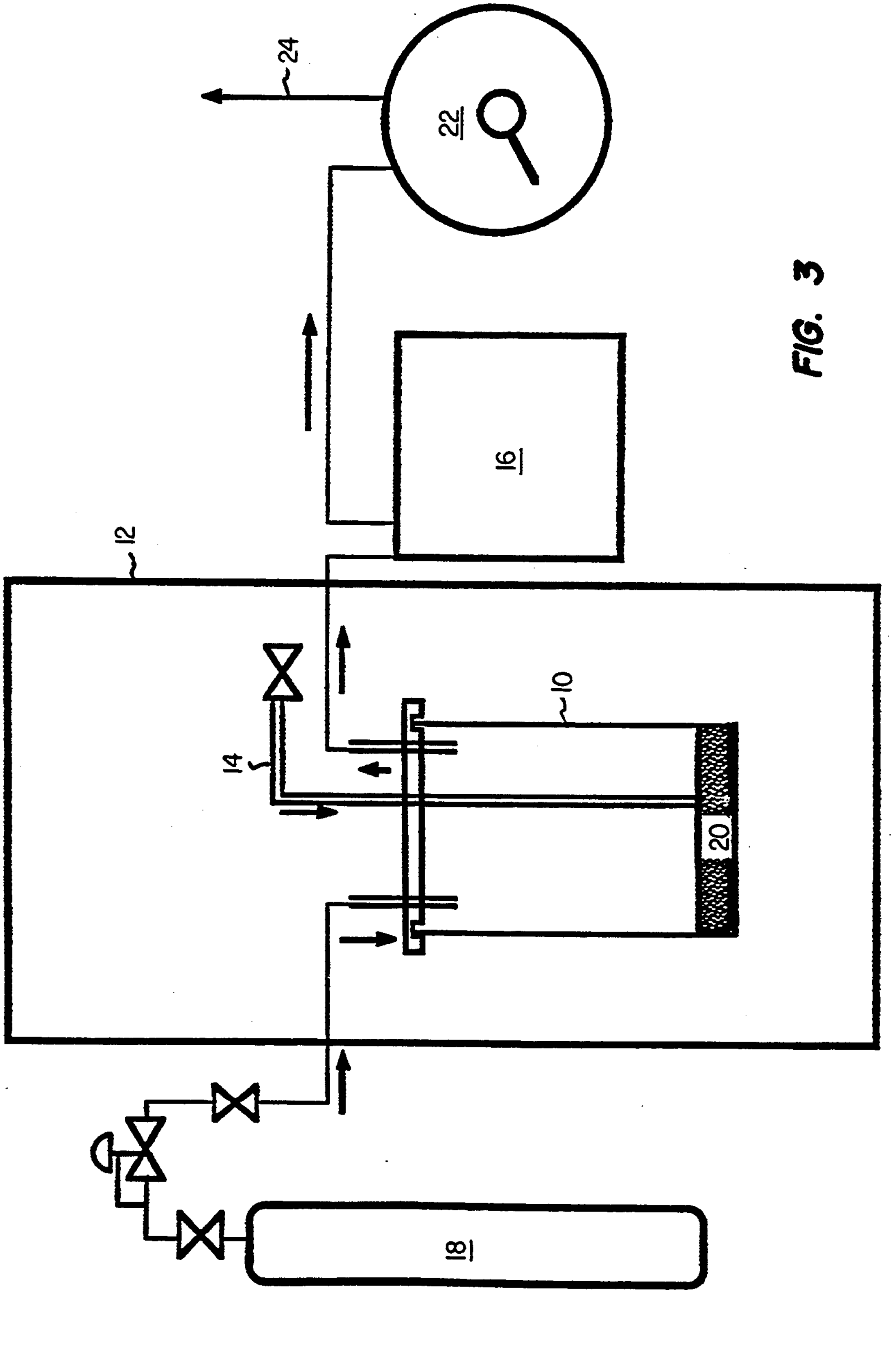
FIG. 3 is a schematic diagram of a vapor emission detection apparatus.

The effectiveness of the foams of the present invention in terms of suppressing hydrocarbon vapors was measured under isothermal and thermal-gradient conditions by loading oil in a vapor-emission cell 10 as shown schematically in FIG. 3. The vapor-emission cell 10 is disposed within an oven 12 and communicates with an oil inlet 14, a gas chromatograph 16 and a supply of nitrogen gas 18. The gas chromatograph 16 communicates with a wet-test meter 22 having a vent 24. Oil 20 may be supplied to the cell 10 and the vapors released from the oil 20 are detected by the gas chromatograph 16.

Isothermal experiments were conducted to measure the rate of crude oil evaporation, with and without foam, at two temperatures: 74° F. as an optimistic case of high foam stability, and 105° F. as a pessimistic case of low foam stability.

Thermal-gradient experiments were conducted with oil heated to a temperature of 90° and 105° F. so that the oil was at a higher temperature than the head gas above the oil or the foam as the case may be. The oil was added to the cell 10 at a rate of 60 to 200 ml/hour. These experiments created a thermal gradient above the oil layer which is believed to mimic more closely the conditions experienced during tanker loading than an isothermal experiment. The results of the isothermal and thermal gradient experiments are shown in Table 3. In Table 3, a 12-inch layer of foam was applied over the oil unless otherwise specified. The amount of produced hydrocarbon was detected by means of a conventional gas chromatograph.

TABLE 3

SUPPRESSION OF VAPOR RELEASE

| Experiment Type | Produced Hydrocarbon (Grams of HC in 24 hours) No Foam | Foam | Suppression of Hydrocarbon Release wt % |
|---|---|---|---|
| Isothermal | | | |
| 74° F. | 3.02 | 0.16 | 95 |
| 105° F. | 4.41 | 0.57 | 87 |
| Thermal Gradient | | | |
| Fast Loading, 90° F. | 3.77 | 0.18 | 95 |
| 105° F. | 3.97 | 0.64 | 84 |
| 105° F. | | 0.43 | 89 |
| Slow Loading with $N_2$ Sweep | 4.05 | 0.43 | 89 |
| Slow Loading - No $N_2$ Sweep | 2.88 | 0.23 | 92 |
| Slow Loading - No $N_2$-6" Foam | | 0.26 | 91 |

For the isothermal experiments, the amount of hydrocarbon gas produced, without a foam blanket, increased as the temperature increased from 74° to 105° F. For the thermalgradient experiments at 90° and 105° F., a small increase was detected. For either the isothermal or thermal gradient experiments, the foam blanket became increasingly more effective at suppressing vapor release into the atmosphere as the oil temperature was reduced. At the end of 24 hours of the thermal gradient experiments, the total amount of hydrocarbons in the effluent was reduced by at least 84% when oil was loaded in the cell 10 at 105° F., and by as much as 95% when oil was loaded in the cell 10 at a lower temperature of 90° F.

Hydrocarbon Evaporation

Figure 4:
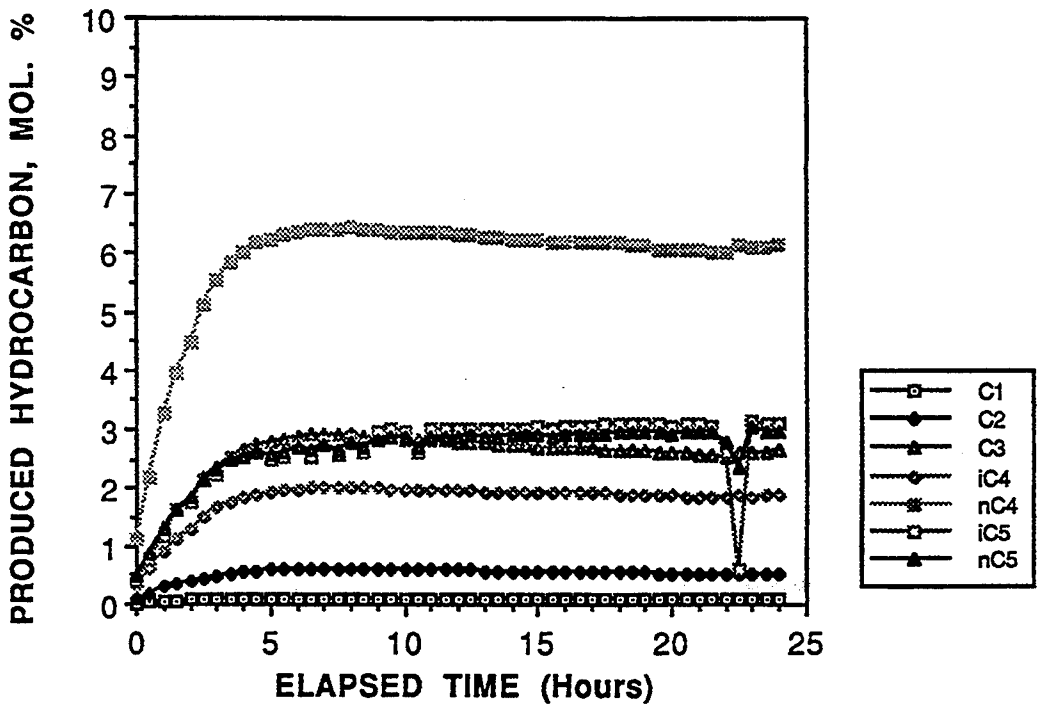
FIG. 4 is a graph of produced hydrocarbon versus elapsed time.

FIGS. 4–7 show the concentration of individual hydrocarbons produced in the effluent gas. FIG. 4 is a graph of produced hydrocarbon versus elapsed time for an isothermal experiment in which the crude oil was at a temperature of 74° F. As shown in FIG. 4, in the case of an isothermal experiment, the concentration of hydrocarbons in the effluent gas increased almost linearly with time during oil loading. Shortly after loading (7–8 hours), the concentration of the various gases reached a plateau value, and appeared to decrease slightly with time toward the second half of the experiment. The concentration of hydrocarbons in the effluent gas demonstrated a similar pattern of produced hydrocarbon in thermal-gradient experiments under fast loading conditions. The cumulative hydrocarbon production in the thermal-gradient experiment was found to increase almost linearly with time during oil loading and increased at a slower pace thereafter.

Figure 6:
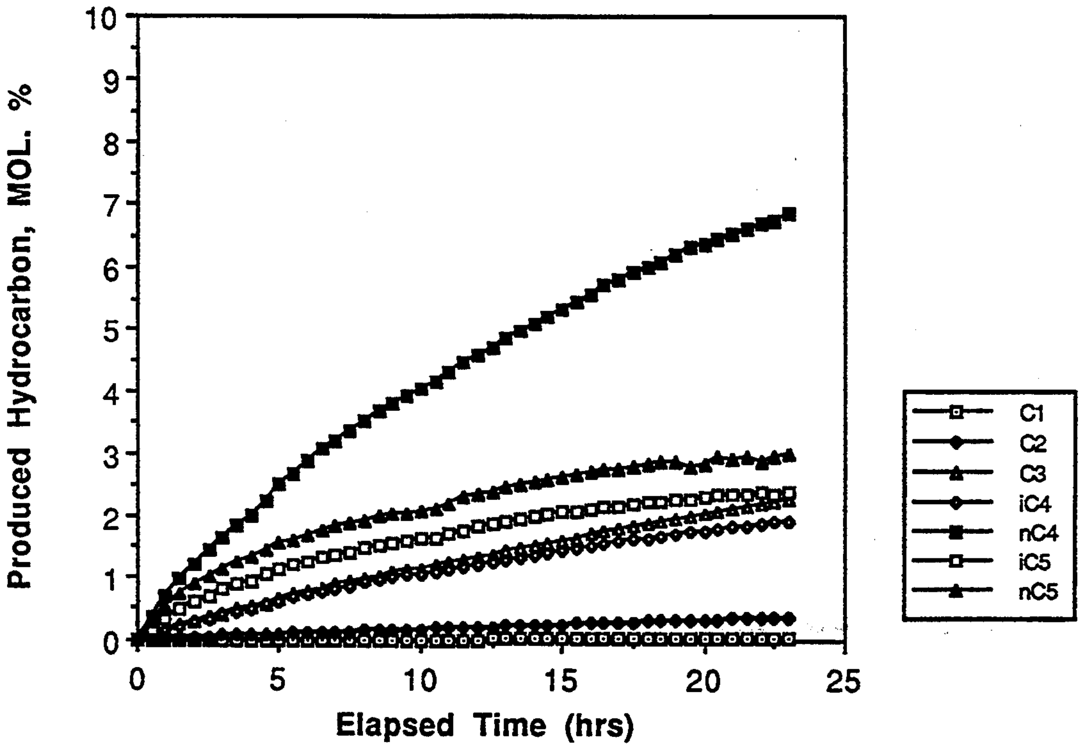
FIG. 6 is a graph of produced hydrocarbon versus elapsed time.

FIG. 6 is a graph of produced hydrocarbon versus elapsed time for a thermal-gradient experiment in which the crude oil was at a temperature of 105° F. and was continuously slow loaded to the experimental cell. As shown in. FIG. 6, in the case of continuous slow loading thermal-gradient experiments, the concentration of the various gases increased almost linearly with time throughout the loading. Thus, the way in which oil was added to the cell (rate and perhaps total amount) strongly affected the results. Moreover, the leveling-off of the hydrocarbon concentrations in this experiment suggested that the sweep of hydrocarbons is faster than their generation in the system with gas diffusion through oil probably constituting the limiting step.

Suppression of Hydrocarbon Release With Foams

Figure 5:
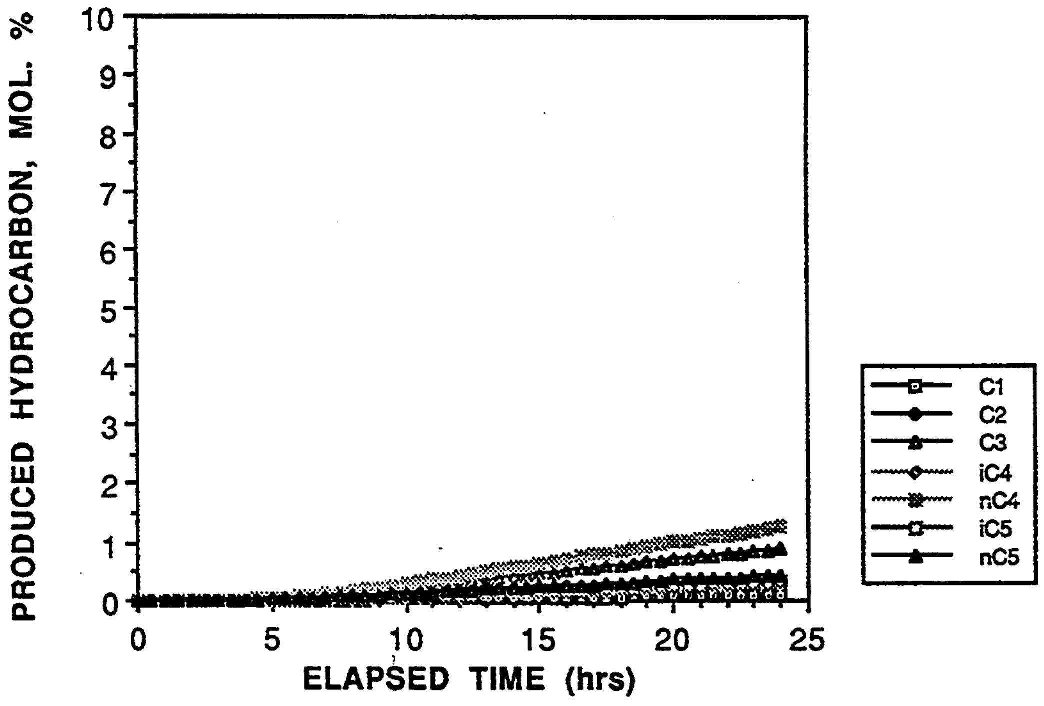
FIG. 5 is a graph of produced hydrocarbon versus elapsed time.
Figure 7:
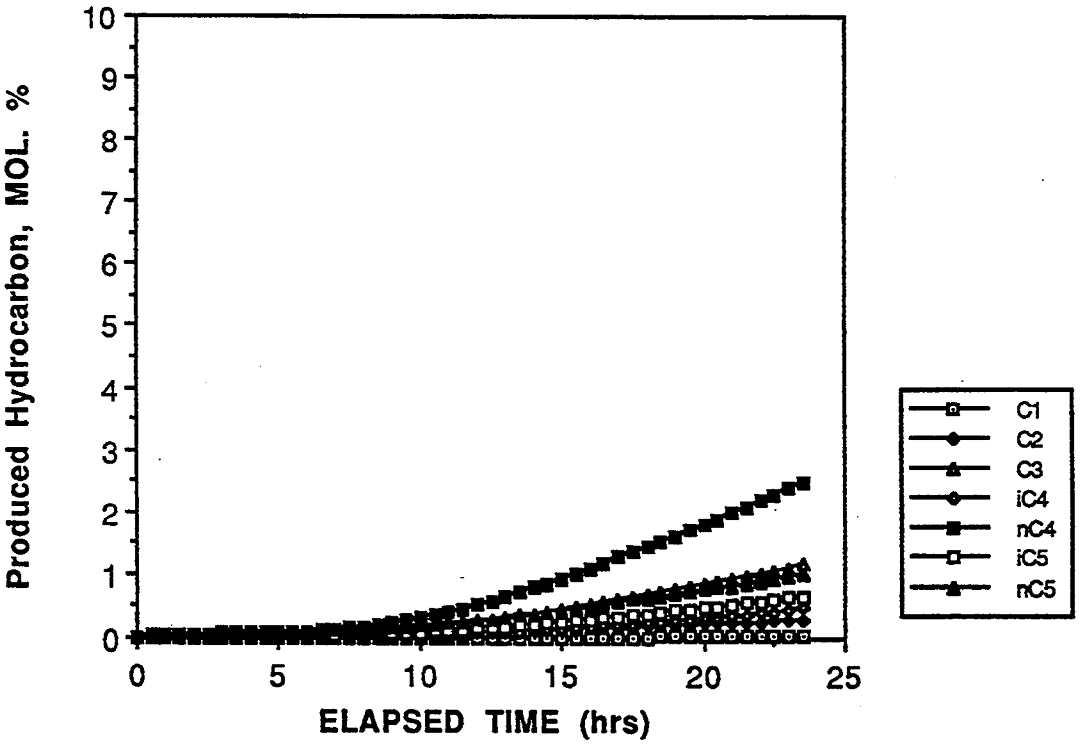
FIG. 7 is a graph of produced hydrocarbon versus elapsed time.

As shown in FIGS. 5 and 7, when a blanket of foam according to the present invention is in place, the rate of gas production in the cell 10 was relatively constant, and the concentration of hydrocarbon gases in the effluent increased monotonically and almost linearly. These results indicate that the evaporation of hydrocarbons was primarily limited by their rate of diffusion through the foam, while the amount or rate of oil addition played a secondary role, if any. The hydrocarbon production rate per unit area of foam was expected to be similar in a tanker, given the same oil and gas temperatures. Upon close inspection, the rates of concentration increase and cumulative production of hydrocarbon gases appeared to have two regimes, i.e. an initially slow rate of increase, followed by a much faster rate of increase after about 10 hours, for instance, see FIGS. 5 and 7. This change of hydrocarbon production rate in the presence of foam means that the foam effectiveness over the first 15–16 hours of loading is much higher than the average effectiveness over the entire 24-hour period. The 24-hour suppression varies from about 83% with 105° F. oil to 95% with 90° F. oil. While this suppression factor may change because of a different base case (without foam), the hydrocarbon production rate with foam is expected to be more insensitive to experimental conditions and may be more readily scaled up to tanker size.

Effects of Oil Loading Temperature

The amount of hydrocarbon gas produced without a blanket of foam according to the present invention increased as the temperature increased from 74° to 105° F., in the isothermal cases, see Table 3. In the thermal-gradient cases, however, the amount of produced hydrocarbons appeared to be only slightly higher at 105°

F. than at 90° F. The amount of hydrocarbon produced at 105° F. (approximately 0.6 grams) in both isothermal and thermal gradient experiments, is three times higher than the amount of hydrocarbons produced at lower temperatures (approximately 0.2 grams). In all cases, the blanket of foam according to the present invention became increasingly more effective at suppressing vapor release into the atmosphere as the oil temperature was reduced.

Conclusions

It was observed that in all cases—in particular in the thermal gradient case which is closer to an actual tanker loading—the foams of the present invention remained quite stable through the entire experiment. Bubbles in the foams became larger as hydrocarbons diffused through them but remained quite stable, except for a few pre-existing holes that were created when the foam was applied inside the cell 10, which holes grew larger as hydrocarbon evaporation proceeded. This stability is due in part to the inert atmosphere of nitrogen gas inside the vessel. In actual usage, it is anticipated that a less stable foam, such as a less concentrated solution, will be used to insure foam collapse after loading and departure from port. Indeed, as the oil cools, the foam of the present invention can remain stable for several days, and perhaps even for a week at 75° F.

EXAMPLE 3

Foam Stability

The components of various foam compositions according to the present invention which included sea water make-up water were treated to form a foam column according to the procedure of Example 1. The decay of the foams was monitored also according to the procedure of Example 1. The sea water make-up water was taken from Valdez, Alaska. The crude oil used in each experiment was Alaskan crude oil.

Foaminess and foam stability tests were conducted for foams including an equivalent active weight percent of 0.75% of APG-225, (1.06% by weight), APG-300 (1.47% by weight) or APG-325 (1.10% by weight); 0.4% by weight of Fluorad FC-754; 6.0% by weight of glycerol; 1600 ppm, 2000 ppm, 2400 ppm or 2800 ppm of Flocon 4800C and a balance of sea water. Foam stability in terms of foam persistence increased for foams made with APG-225, APG-300 and APG-325 surfactant as the concentration of the polymer, Flocon 4800C, increased from 1600 ppm:to 2800 ppm.

Foaminess and foam stability tests were conducted for foams including an equivalent active weight percent of 0.75% of APG-225, (1.06% by weight), APG-300 (1.47% by weight) or APG-325 (1.10% by weight), 0.4% by weight of Fluorad FC-754, 6.0% by weight of glycerol, 2800 ppm of Flocon 4800C and a balance of sea water. Foams made with each surfactant presisted for more than 15 hours although foams made with APG-300 had greater stability in terms of the longest foam persistence than foams made with APG-225 and APG-325, at the same concentration of Fluorad FC-754.

Figure 8:
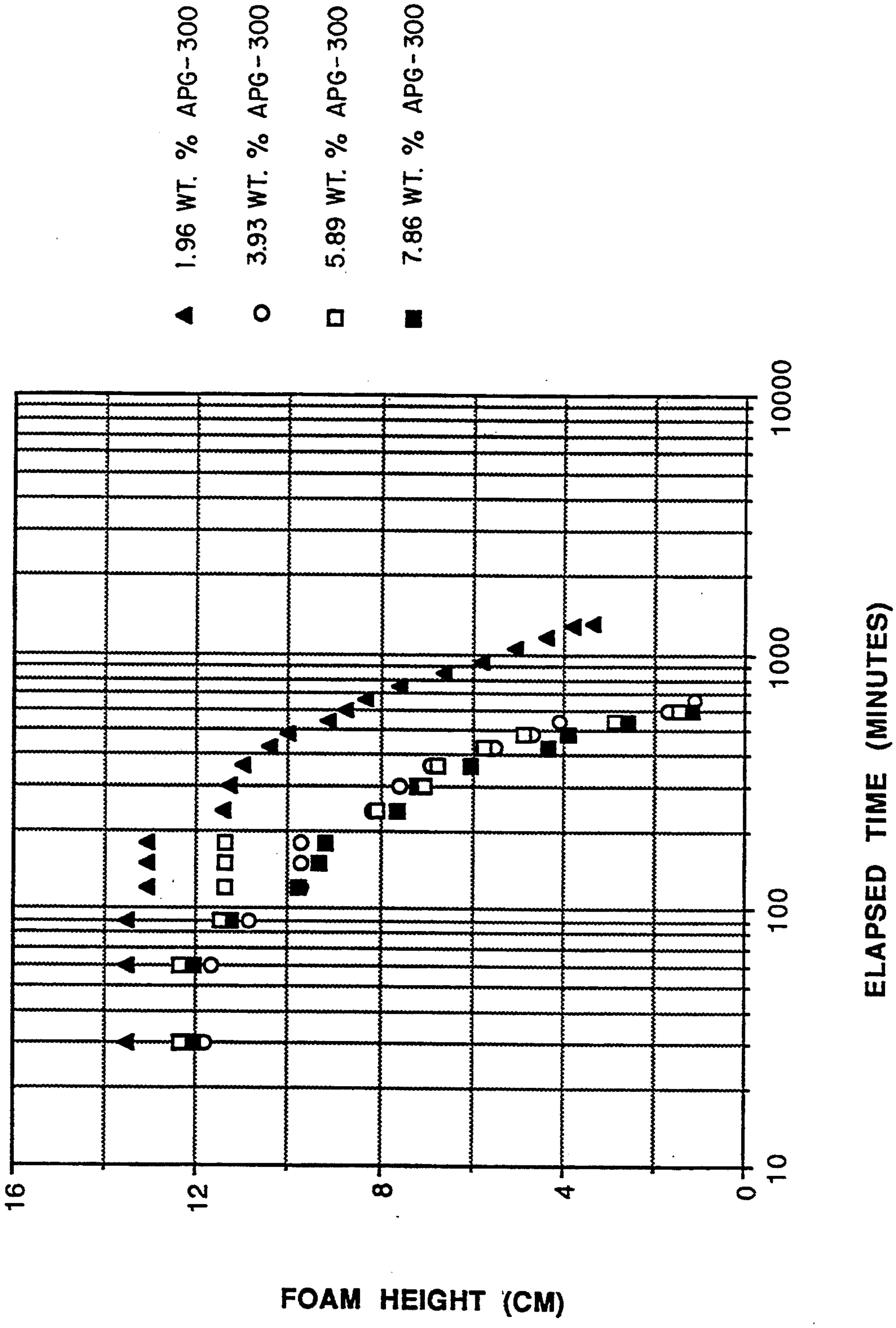
FIG. 8 is a graph showing the foaminess and foam stability of various foam formulations according to the present invention.

FIG. 8 is a graph of foaminess and foam stability for foams including 1.96%, 3.93%, 5.89% or 7.86% by weight of APG-300 as indicated, as well as 0.4% by weight of Fluorad FC-754, 6.0% by weight of glycerol, 2800 ppm of Flocon 4800C and a balance of sea water. As shown in FIG. 8, foams including 1.96% by weight of APG-300 had the highest foam stability and foam stability decreased as the concentration of APG-300 exceeds 1.96% by weight. These foams demonstrate the impact of the nonionic surfactant to fluorinated surfactant ratio on the stability of the foam. For instance, the foam including 1.96% by weight of the nonionic surfactant (APG-300) and 0.4% by weight of the fluorinated surfactant (Fluorad) had a nonionic surfactant to fluorinated surfactant ratio of 4.9:1 which is within the preferred ratio range for sea water compositions. This foam had the best stability of the foams depicted in FIG. 8. The other foams had nonionic surfactant to fluorinated surfactant ratios of 9.8:1, 14.7:1 and 19.6:1 which are outside the preferred ratio range and have poor stability when compared to the foam in which the ratio is within the preferred range.

Foaminess and foam stability tests were conducted for foams including 0.98%, 1.47% or 1.96% by weight of APG-300, 0.4% by weight of Fluorad FC-754, 6.0% by weight of glycerol, 2800 ppm of Flocon 4800C and a balance of sea water. Foams made with each concentration of surfactant persisted for more than 15 hours and the stability of the foams remained about the same as the concentration of APG-300 ranged from 0.98 to 1.96% by weight.

Foaminess and foam stability tests were conducted for foams including 0.98%, 1.47% or 1.96% by weight of APG-300, 0.4% by weight of Fluorad FC-754, 5.0% by weight of glycerol, 2800 ppm of Flocon 4800C and a balance of sea water. Foams made with each concentration of surfactant persisted for ore than 15 hours and the stability of the foams remained about the same as the concentration of APG-300 ranged from 0.98 to 1.96% by weight, although foams including 1.96% by weight of APG-300 had a greater initial foam height than foams including 0.98% and 1.47% by weight of APG-300.

Figure 9:
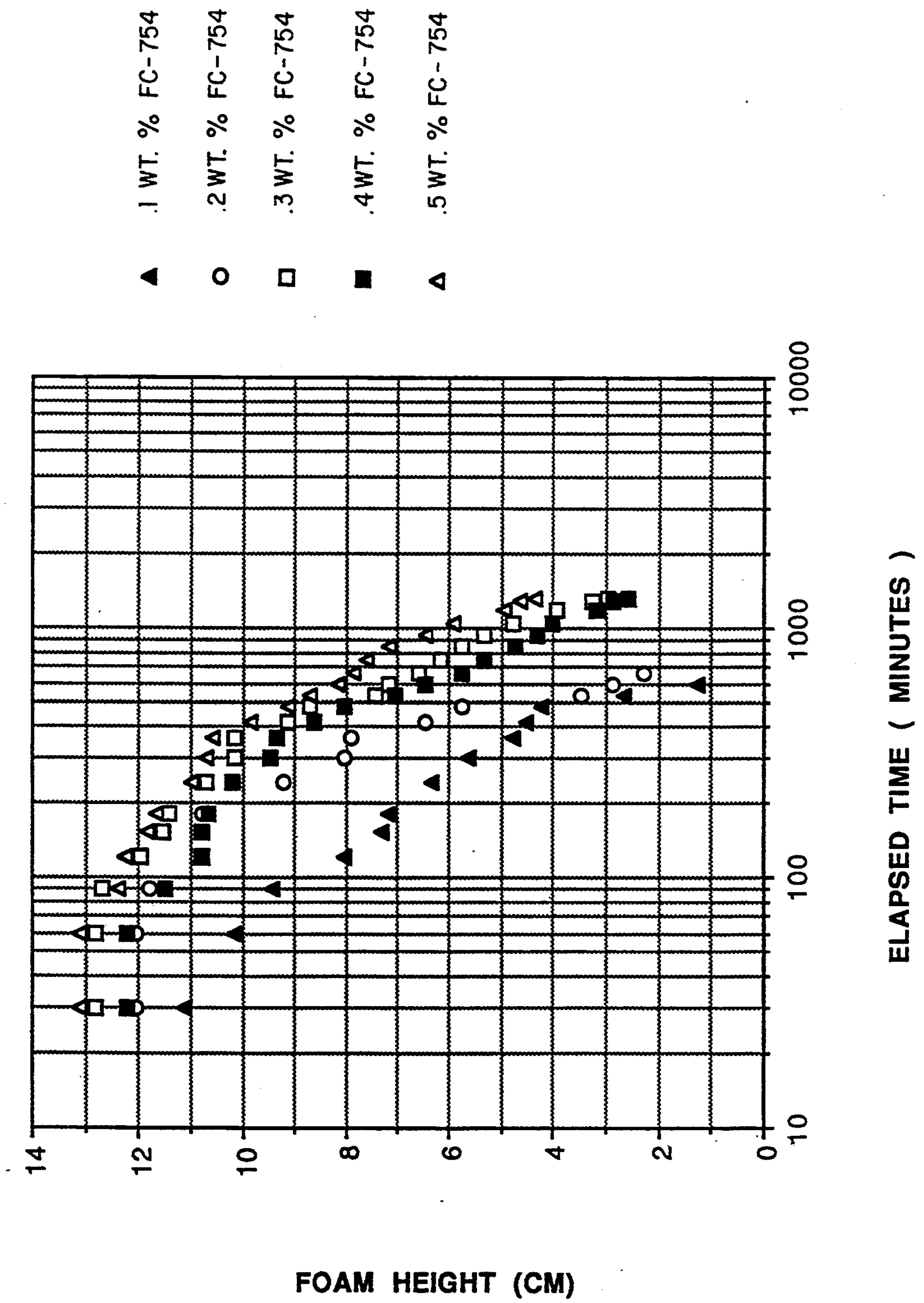
FIG. 9 is a graph showing the foaminess and foam stability of various foam formulations according to the present invention.

FIG. 9 is a graph of foaminess and foam stability for foams including 0.1%, 0.2%, 0.3%, 0.4% or 0.5% by weight of Fluorad FC-754 as indicated, as well as 1.47% by weight of APG-300, 6.0% by weight of glycerol, 2800 ppm of Flocon 4800C and a balance of sea water. As shown in FIG. 9, foam height and foam stability generally increase as the concentration of Fluorad FC-754 increases from 0.1% to 0.5% by weight. This effect is dramatic between 0.1% and 0.2% by weight of Fluorad FC-754 where foam stabilities are unacceptably low. These foams had a nonionic to fluorinated surfactant ratio of 14.7:1 and 7.35:1, respectively. The gain in foam height and stability is dramatic between 0.2% and 0.3% by weight of Fluorad FC-754 while the gain in foam height and stability is less apparent between 0.3% and 0.5% by weight of Fluorad FC-754. The foams including 0.3–0.5% by weight of Fluorad FC-754 had nonionic to fluorinated surfactant ratios of 4.9:1, 3.7:1 and 2.9:1, respectively. These foams also demonstrate the impact of the nonionic surfactant to fluorinated surfactant ratio on the stability of the foam.

Foaminess and foam stability tests were conducted for foams including 0.98%, 1.47%,. or 1.96% by weight of APG-300, 0.4% or 0.5% by weight of Fluorad FC-754, 6.0% by weight of glycerol, 2800 ppm of Flocon 4800C and a balance of sea water. As the ratio of nonionic surfactant to fluorinated cationic surfactant decreases from 4.90:1 to 2.45:1 the foam height and foam stability varies only slightly, however, at a ratio of 1.96:1 (0.98% by weight APG 300 and 0.5% by weight of Fluorad FC-754) the foam stability begins to decrease.

Figure 10:
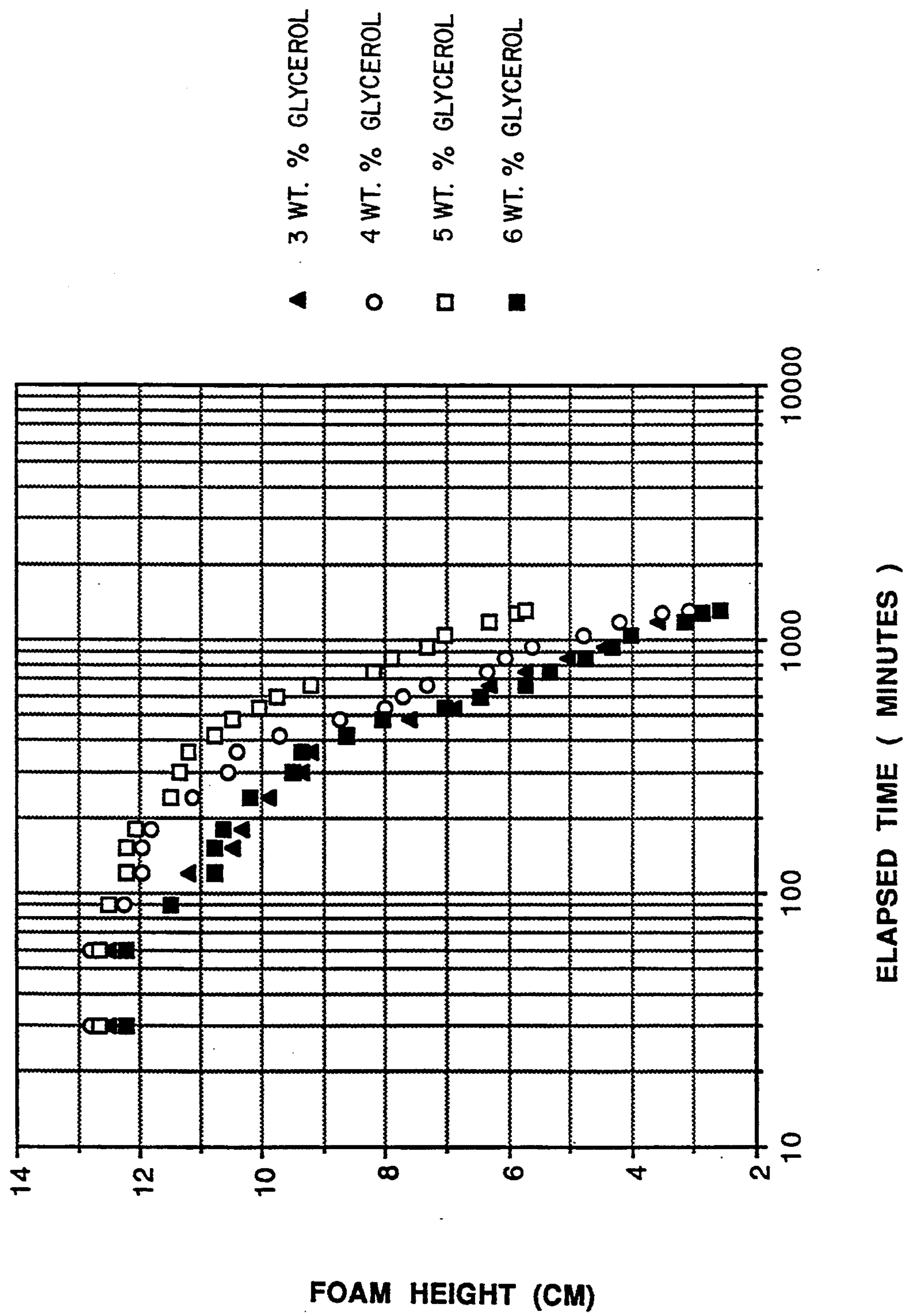
FIG. 10 is a graph showing the foaminess and foam stability of various foam formulations according to the present invention.

FIG. 10 is a graph of foaminess and foam stability for a foam including 1.47% by weight of APG-300, 0.4% by weight of Fluorad FC-754, 3.0%, 4.0%, 5.0% or 6.0% by weight of glycerol, 2800 ppm of Flocon 4800C and a balance of sea water. As shown in FIG. 10, foam stability improves noticeably as the glycerol concentration increases from 3.0% to 5.0% by weight but begins to decrease when the glycerol concentration increases to 6.0% by weight.

Foaminess and foam stability tests were conducted for foams including 0.98%, 1.47%, or 1.96% by weight of APG-300, 0.4% by weight of Fluorad FC-754, 5.0% or 6.0% by weight of glycerol, 2800 ppm of Flocon 4800C and a balance of sea water. As the concentration of glycerol increased from 5.0% to 6.0% by weight, the foam stability remained approximately the same, although foam height appeared to decrease in the case of foams including 1.96% by weight of APG-300.

Although preferred embodiments of the present invention have been described in some detail herein, various substitutions and modifications may be made to the compositions of the invention without departing from the scope and spirit of the appended claims.

What is claimed is:

1. A foam solution, comprising:

a) about 0.5 to about 6.0% by weight of one or more nonionic surfactants;

b) about 0.05 to about 1.0% by weight of a fluorinated surfactant;

c) about 500 to about 5,000 ppm of a polymer selected from the group consisting of natural and modified natural polymers and synthetic polymers; wherein said natural and modified natural polymers are selected from the group consisting of gum ghatti, gum arabic, gum tragacanth, locust bean gum, gum karaya, guar gum, carrageenan, algin, xanthan gum, welan gum, and hydroxyethyl-, carboxymethyl-, hydroxyethyl carboxymethyl- and hydroxypropyl- ether derivatives thereof, and hydroxyethyl-, carboxymethyl-, hydroxyethyl- carboxymethyl- and hydroxyproply- ether derivatives of cellulose and mixtures thereof; and wherein said synthetic polymers are selected from the group consisting of polyimines, poly(acrylic acid), poly(-methacrylic acid), poly(maleic acid-co-ethylene), poly(maleic acid-co-ethylvinylether), poly(maleic acid-co-butylvinylether), poly (maleic acid-co-styrene), poly(maleic acid-co-indene), poly(vinylsulfuric acid), poly(styrenesulfonic acid), polyphosphate (linear), dextransulfate, poly(L-glutamic acid), and bovine serum albumin;

d) about 1.0 to about 10.0% by weight of one or more solvents selected from the group consisting of alcohols; and e) a balance of water with the total of all components amounting to 100% by weight;

said foam solution being capable of forming a foam having a persistence of at least 12 hours at temperatures of from 75° to 105° F.

2. A foam composition according to claim 1, wherein said one or more nonionic surfactants comprise an alkyl polyethyleneglycol ether.

3. A foam composition according to claim 1, wherein said one or more nonionic surfactants comprise trimethyl nonylpolyethyleneglycol ether.

4. A foam composition according to claim 1, wherein said one or more nonionic surfactants comprise an alkyl polyglycoside.

5. A foam composition according to claim 1, wherein said fluorinated surfactant is selected from the group consisting of a fluorinated quaternary ammonium chloride, a fluorinated quaternary ammonium iodide, and a zwitterionic fluorinated surfactant.

6. A foam composition according to claim 1, wherein said one or more solvents are selected from the group consisting of methanol, ethanol, propanol, glycerol, ethylene glycol and polyethylene glycol.

7. A foam composition according to claim 1, comprising:

a) about 2.0 to about 4.0% by weight of said one or more nonionic surfactants;

b ) about 0.2 to about 0.4% by weight of said fluorinated surfactant;

c) about 2.0 to about 6.0% by weight of said one or more solvents;

d ) about 1,000 to about 2,500 ppm of said polymer; and e) wherein said water is comprised of fresh water.

8. A foam composition according to claim 7, comprising:

a) about 4.0% by weight of said one or more nonionic surfactants;

b) about 0.4% by weight of said fluorinated surfactant;

c ) about 6.0% by weight of said one or more solvents;

d) about 1600 ppm of said polymer; and e) wherein said water is comprised of fresh water.

9. A foam composition according to claim 7, comprising:

a) 2.0% by weight of said one or more nonionic surfactants;

b) 0.225% by weight of said fluorinated surfactant;

c) 5.0% by weight of said one or more solvents;

d) 1800 ppm of said polymer; and e) wherein said water is comprised of fresh water.

10. A foam composition according to claim 7 wherein a ratio of said nonionic surfactants to said fluorinated surfactants ranges from 6:1 to 12:1.

11. A foam composition according to claim 10 wherein said ratio of said nonionic surfactants to said fluorinated surfactants ranges from 8:1 to 10:1.

12. A foam composition according to claim 1 comprising:

a) about 1.5 to about 4.0% by weight of said one or more nonionic surfactants:

b) about 0.4 to about 0.6% by weight of said fluorinated surfactant;

c) about 4.0 to about 8.0% by weight of said one or more solvents;

d) about 1,500 to about 3,000 ppm of said polymer; and e) wherein said water is comprised of sea water.

13. A foam composition according to claim 12, comprising:

a) about 1.5% by weight of said one or more nonionic surfactants;

b) about 0.5% by weight of said fluorinated surfactant;

c) about 6.0% by weight of said one or more solvents;

d ) about 2800 ppm of said polymer; and e) wherein said water is comprised of sea water.

14. A foam composition according to claim 12, comprising:

a) 2.013% by weight of said one or more nonionic surfactants;

b) 0.5% by weight of said fluorinated surfactant;

c) 8.0% by weight of said one or more solvents;

d) 2800 ppm of said polymer; and e) wherein said water is comprised of sea water.

15. A foam composition according to claim 12 wherein a ratio of said nonionic surfactants to said fluorinated surfactant ranges from 1.5:1 to 9.5:1.

16. A foam composition according to claim 15 wherein said ratio of said nonionic surfactants to said fluorinated surfactant ranges from 2.4:1 to 5:1.

17. A foam comprising: from 10 to 1,000 parts of gas to 1 part of a foam composition according to claim 7.

18. A foam according to claim 17 wherein said foam persists for 12 hours to 5 days at a temperature of from about 75° to about 105° F.

* * * * *